(12) United States Patent
Hendrian et al.

(10) Patent No.: US 6,450,890 B1
(45) Date of Patent: Sep. 17, 2002

(54) MINIMAL MASS HOLLOW BALANCE SHAFT

(76) Inventors: Michael D. Hendrian, 59542 Barkley, New Hudson, MI (US) 48165; Steven J. Chevalier, 13630 Goodrich Rd., Britton, MI (US) 49229; William C. Sisco, 1451 25 Mile Rd., Homer, MI (US) 49245

( * ) Notice: Subject to any disclaimer, the term of this patent is extended or adjusted under 35 U.S.C. 154(b) by 0 days.

(21) Appl. No.: 08/957,552

(22) Filed: Oct. 24, 1997

(51) Int. Cl.[7] .................................................. F16C 3/02
(52) U.S. Cl. ...................................................... 464/180
(58) Field of Search ................................ 464/180, 181, 464/183; 74/604

(56) References Cited

U.S. PATENT DOCUMENTS

| | | | | | |
|---|---|---|---|---|---|
| 2,001,165 A | * | 5/1935 | Swennes | ...................... | 464/180 |
| 2,001,166 A | * | 5/1935 | Swennes | ...................... | 464/180 |
| 2,781,436 A | * | 2/1957 | Barden | ...................... | 464/180 |
| 2,838,957 A | * | 6/1958 | Johnson | ...................... | 74/604 |
| 3,286,487 A | * | 11/1966 | Esperson | ...................... | 464/180 |
| 3,555,927 A | * | 1/1971 | Plume | ...................... | 464/180 |
| 3,964,342 A | * | 6/1976 | Bean, Jr. et al. | ............ | 464/180 |
| 4,036,030 A | * | 7/1977 | Papst | ...................... | 464/180 |
| 4,406,641 A | * | 9/1983 | Mallet | ...................... | 464/180 |
| 4,819,505 A | | 4/1989 | Takubo et al. | | |
| 4,844,193 A | * | 7/1989 | Veselica et al. | .............. | 464/180 |
| 5,331,737 A | * | 7/1994 | Jarvela | ...................... | 464/180 |
| 5,483,932 A | | 1/1996 | Friedman et al. | | |
| 5,857,388 A | * | 1/1999 | Killion et al. | | |

FOREIGN PATENT DOCUMENTS

| | | | | | |
|---|---|---|---|---|---|
| FR | 805626 | * | 11/1936 | ................... | 464/180 |
| GB | 404153 | * | 1/1934 | ................... | 464/180 |
| GB | 2041159 | * | 9/1980 | ................... | 464/180 |

* cited by examiner

Primary Examiner—Greg Binda

(57) ABSTRACT

A hollow tubular balance shaft member having bobweights of minimal mass. The tubular member is preferably made by a deep drawn process. One or more bobweights is positioned in the tubular member during formation thereof. The invention can be used for all vehicle engines which need counterbalancing mechanisms, such as 90° V-6 engines and inline four cylinder engines. Various mechanisms can be used to secure and hold the bobweights in position in the tubular member, such as welding, adhesive bonding, staking, brazing, and the like. One end of the balance shaft member has a drive member on which a drive gear is positioned and used to rotate the balance shaft by the engine.

28 Claims, 9 Drawing Sheets

FIG.IOA

FIG.IOB

MINIMAL MASS HOLLOW BALANCE SHAFT

TECHNICAL FIELD

The present invention relates to balance mechanisms for rotating machinery, particularly balance shafts for multi-cylinder internal combustion engines which exhibit shaking forces and/or rotating imbalanced couples.

BACKGROUND OF THE INVENTION

Balance shafts are commonly used to reduce or cancel shaking forces and/or vibrations which result from residual imbalances inherent in the design architecture of machinery with rotating parts or mechanisms, such as motors. These balance shafts are often called "counterbalance" shafts.

Balance shafts are particularly valuable when operator or passenger comfort and freedom from noise and vibration-related fatigue or distraction are desired, as in the case of motor vehicles such as automobiles, motorcycles, and the like. It is also advantageous to minimize vibration from the standpoint of equipment reliability. Where vibrations are reduced, the size, mass and/or complexity of the mounting structures can often also be reliably reduced, thus potentially reducing cost.

Some multi-cylinder motor vehicle engines, such as the 90-degree V-6 engines (i.e., 6-cylinder engines with two sets of three cylinders positioned 90-degrees apart), produce resultant imbalanced forces in the form of a crankshaft-speed rotating couple. These engines benefit from a single balance shaft with two balance weights, or masses, on opposite sides of its axis of rotation, but spaced apart axially, so as to have a dynamic imbalance providing a rotating couple. The couple produced by the balance shaft is designed to oppose or cancel that of the engine when the shaft is rotating at crankshaft speed and in the opposite directions of the crankshaft. The axial location of this "rotating couple"-type shaft relative to the engine is not critical as the output of the balance shaft is a pure couple or torque on the crankcase.

Inline four-cylinder engines also benefit from balance shafts, although for different reasons than V-6 engines and due to different vibrating characteristics. Balance shafts for inline four-cylinder engines typically are paired to rotate in opposite directions at twice the engine speed. The two balance shafts cancel each other's lateral shaking forces while opposing the vertical secondary shaking forces that are typical with this type of engine. Each shaft produces a single unbalance force, which taken together with its mating shaft's unbalance force, produces a resultant vertical shaking force located centrally among the bank of cylinders. These "single unbalance" type shafts are shown, for example, in U.S. Pat. No. 4,819,505.

Balance shafts can be rotated in the same direction as the engine crankshaft, or in the opposite direction, as required for the particular engine. Some engines require a pair of balance shafts rotating in opposite directions. Balance shafts typically have an elongated support member and one or more weights (often called "bobweights"). The bobweights can be positioned on the same side or on opposite sides of the support member, as required.

One conventional type of balance shaft for a 90° V-6 engine comprises a pair of opposed bobweights positioned between a pair of bearing surfaces at the two outer ends of the shaft. The bearing surfaces are supported in bearings which allow the balance shaft to rotate in accordance with the speed of the engine. A drive member at one end is connected to a gear which is driven by the engine which, in turn, rotates the balance shaft. This balance shaft is normally driven at the speed of the crankshaft of the engine and thus at twice the speed of the camshaft.

One type of improved balance shaft is shown in U.S. Pat. No. 5,483,932 which issued on Jan. 16, 1996, is entitled "Hollow Balance Shaft", and is commonly owned with the present invention. The balance shaft in the '932 patent is stiffer than known balance shafts and can rotate at increased speeds without harmful bending or adversely affecting the bearings. In accordance with the '932 patent, the balance shaft has a hollow tube with plugs positioned in each end. The disclosure of U.S. Pat. No. 5,483,932 is hereby incorporated by reference herein.

Another improved balance shaft is disclosed in U.S. Pat. No. 5,857,388, which was filed on Jul. 9, 1996 and is entitled "Balance Shafts Having Minimal Mass". The disclosure of that patent application is also hereby incorporated by reference herein. In accordance with U.S. Pat. No. 5,857,388 the bobweights on the balance shafts have curved surfaces which are representations of hyperbolic curves or reasonable approximations thereof, and the connector portions preferably are shaped like I-beams with concave sides, both features designed to reduce the weight and cost of the balance shafts.

SUMMARY OF THE INVENTION

It is an object of the present invention to provide improved balance shafts for automobile engines which can balance or neutralize engine noise and vibration forces. It is another object of the present invention to provide balance shafts which are stiffer and lighter than traditional balance shafts.

It is still another object of the present invention to provide balance shafts which can rotate at a predetermined speed without bending or causing excessive bearing wear. It is a further object of the present invention to provide means for securing bobweights in hollow tubular structures in order to provide improved, light-weight balance shafts.

Other benefits, features and advantages of the present invention will become apparent from the following description, when taken in accordance with the appended claims and accompanying drawings.

The present invention provides an improved balance shaft which is stiffer than known balance shafts, has the ability to rotate at increased speed without harmful bending or adversely affecting the bearings, and is lighter in weight and potentially has lower manufacturing costs than known balance shafts. The balance shaft has a hollow tubular structure which preferably is made of a deep drawn material and enclosed at one or both ends. One or more balance weights are positioned inside the hollow structure and held in place by various means, such as welding, brazing, mechanically fastening, and the like. Alternative mechanisms for securing and aligning the weights in the hollow structure include, for example, foam material, ring members, support members, indexing structures, and/or biasing members (springs, etc.).

Preferably, for 90° V-6 engines, the balance weights that are positioned in the hollow tubular structure have a generally hyperbolic shaped surface. The hyperbolic curve represents a locus of constant contribution to the unbalanced couple produced by the shaft. This also results in lighter weight and thus also potentially lowers cost by means of improved utilization of materials in the balance weight areas of the balance shaft.

Preferably, for four-cylinder engines, a single balance weight is provided in a hollow tubular structure. The balance weight is fixedly secured in the structure, has a uniform cross-section throughout its length, and is centrally positioned in the tubular structure.

For rotation, bearing mechanisms, such as ball bearing members, are positioned at two or more points on the outer surface of the hollow tubular structures. Also, one of the ends of the balance shafts is formed or provided with a drive member or extended portion which is adapted to be rotated by a belt, chain or gear drive. For this purpose, a driving gear is positioned on the drive member.

The present invention has many significant advantages over known balance shafts. The inventive balance shafts are lighter and potentially less expensive than known balance shafts and do not sacrifice strength or durability. With less weight and less deflection, smaller and less expensive components, such as smaller bearing members, can be utilized. Also, the lighter weight can create less friction in the system possibly utilizing less horsepower of the engine to turn the balance shafts, thereby creating additional savings in weight and cost in the engine and vehicle. The smoother and more uniform external surface of the tubular balance shafts also allows the balance shafts to rotate more easily through the oil or fluid in the engine creating less frothing and less drag.

The one-piece tubular member utilized in the inventive balance shafts provides a stronger and more homogeneous structure with fewer joints and less components. In this regard, a one-piece tubular "bottle" structure with one "closed" end and one "open" end has the fewest components and fewest joints in accordance with the present invention.

By eliminating the heavy connection members between bobweights (on conventional V-6 or similar engines) or between a bearing member and a bobweight (on conventional inline 4-cylinder engines), the present invention provides a lighter product which is smaller, has less bending or deflection, and is potentially less expensive. In this regard, smaller bobweights and thinner materials can be utilized. Positioning the bobweights under the bearing journals also saves weight, increases rigidity or stiffness (less subject to bending), and reduces the size and length of the balance shaft necessary for its purpose.

These and other features and advantages of the present invention will become apparent from the following description of the invention, when viewed in accordance with the accompanying drawings and appended claims.

BRIEF DESCRIPTION OF THE DRAWINGS

FIGS. 10A and 10B are cross-sectional views of the balance shaft shown in FIG. 10, the cross-sectional views being taken along lines 10A—10A and 10B—10B, respectively, and in the direction of the arrows;

FIG. 24 illustrates a further embodiment of the invention;

BEST MODE(S) FOR CARRYING OUT THE INVENTION

Figure 1:
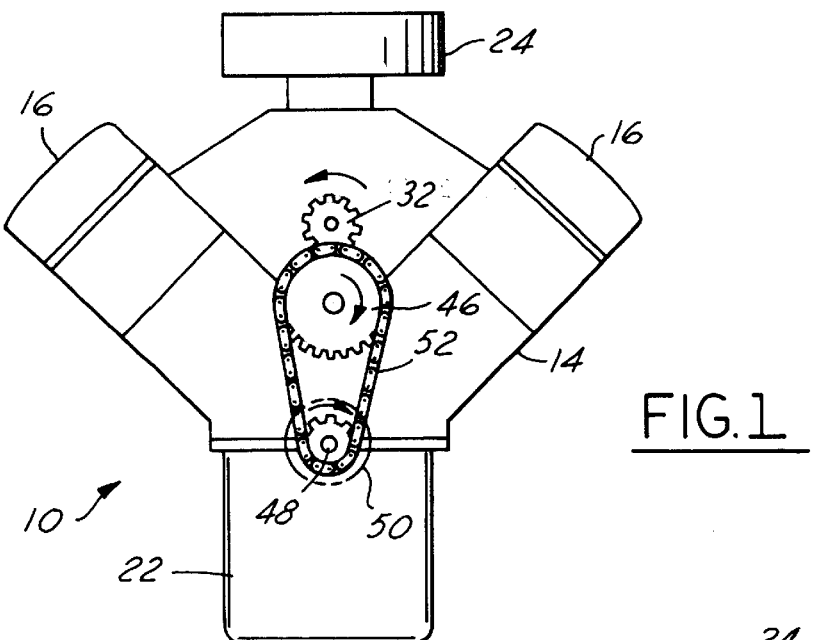
FIG. 1 is a front elevational view of an automobile engine incorporating a rotating couple-type balance shaft in accordance with the present invention.
Figure 2:
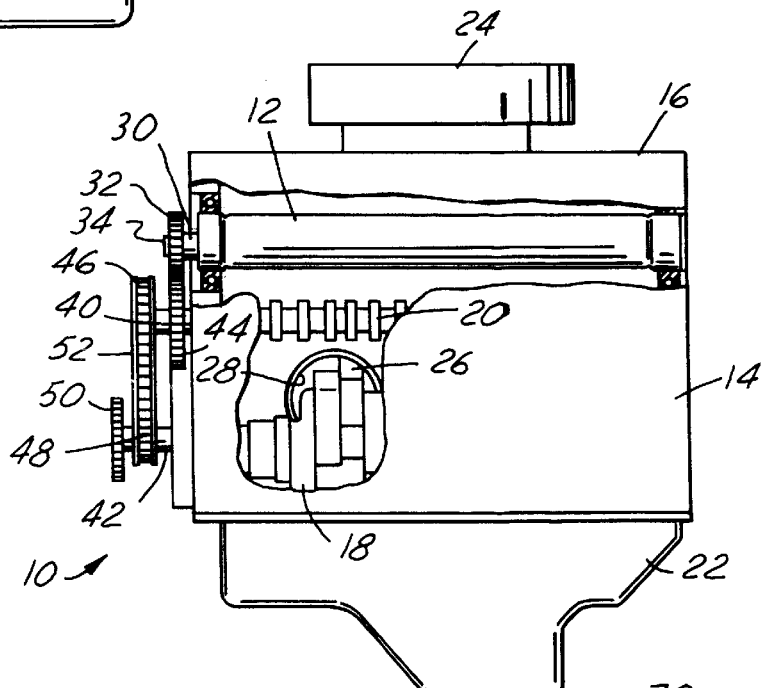
FIG. 2 is a side elevational view of the engine shown in FIG. 1.

Preferred embodiments of the present invention are shown in the drawings. The present inventive balance shaft invention can be used in any type of automobile engine where it is necessary or desirable to reduce or cancel shaking forces and/or vibrations which result from the residual imbalances inherent in the design and operation of the engine. A representative engine in which the present invention can be used is shown in FIGS. 1 and 2 and generally referred to by the reference numeral 10.

The engine 10 is a V-6 engine with two sets of three cylinders spaced 90-degrees apart. These engines, due to their structure and geometry, produce an imbalanced couple which rotates in the opposite direction of the crankshaft, and can significantly benefit from a counter-rotating balance shaft of the rotating couple-type. A balance shaft 12, made in accordance with the present invention, is utilized with the engine 10 and shown in FIGS. 2 and 3. The couple produced by the balance shaft 12 is designed to oppose or cancel that of the engine when the balance shaft is rotating at crankshaft speed and in the opposite direction.

The engine 10 in which the balance shaft 12 is situated, generally comprises a cylinder block 14, a pair of cylinder heads 16, a crankshaft 18, a camshaft 20, an oil pan 22 and an air cleaner 24. A plurality of pistons 26 are positioned in cylinders 28 and connected to the crankshaft 18.

A drive member or driveshaft 30 on the balance shaft protrudes outside the front of the cylinder block 14 and has a drive gear or sprocket 32 attached to it. The gear 32 is oriented and attached to the driveshaft 30 by a slot and key mechanism 36, or by any other conventional means. For example, the gear 32 could be attached to a welded plug member 35 by a bolt 34 (as shown in FIG. 2).

The camshaft 20 and crankshaft 18 also have drive members or driveshafts 40 and 42, respectively, which protrude outside the front of the cylinder block 14. Member 40 of camshaft 20 is secured to drive gear 44 and sprocket 46. Member 42 of crankshaft 18 is secured to drive sprocket 48. A vibration damper 50 is also preferably attached to member 42 of the crankshaft 18. Sprockets 46 and 48 are connected by a conventional drive chain or tooth timing belt 52. Drive gear 44 is meshed with gear 32 on the balance shaft 12.

Sprockets 48 and 46 are both rotated in the same direction by the drive chain or tooth timing belt 52, as shown in FIG. 1. The respective sizes and diameters of sprockets 46 and 48 are such that the crankshaft 18 rotates at twice the speed of the camshaft 20.

The meshing of gears 32 and 44 causes the balance shaft 12 to rotate in a direction opposite to that of the crankshaft and thus counterbalance the vibrations caused by the engine 10. The size and diameter of the gears 32 and 44 determine the rotational speed of the balance shaft 12. Typically, balance shaft 12 is rotated at twice the speed of the camshaft 20 and at the same speed as the crankshaft 18.

In accordance with the present invention, the balance shaft 12 is generally comprised of a hollow tubular member 60 in which bobweights (or balance weights or masses) 62 and 64 are positioned. The balance shaft 12 rotates around longitudinal axis 65. The tubular member 60 is preferably made of deep drawn steel, but can be made of other materials which have comparable durability and strength. The two balance weight members 62 and 64 are preferably also made from a metal material, such as cast iron, tungsten, barstock steel, powdered metal, or the like. The weights also can be made of any other material which meets the requirements of the application.

The balance weights 62 and 64 preferably have a hyperbolic shape on their radially inner surfaces 62' and 64', although reasonable approximations of hyperbolic curves could be used for those surfaces. The hyperbolic shape for the weights 62 and 64 provides the least weight for a counter balance application.

The reasons for providing the curved surfaces 62' and 64', preferably in a hyperbolic shape or an approximation thereof, are set forth in the co-pending U.S. Pat. No. 5,857,388, which was filed on Jul. 9, 1996, and is entitled "Balance Shafts Having Minimal Mass". That patent application is co-owned with the present invention and the subject matter of U.S. Pat. No. 5,857,388 is hereby incorporated by reference herein. In that patent application, several shapes of hyperbolic curves or approximations thereof are shown, any of which can be used for the balance weights (or bobweights) shown in FIGS. 3–26 and utilized in accordance with the present invention.

Figure 17:
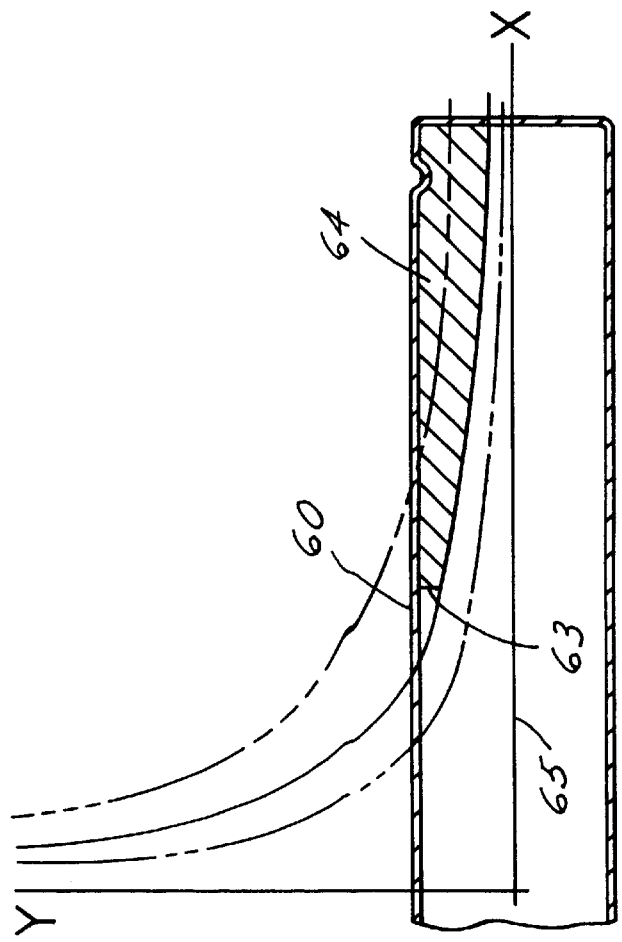
FIG. 17 illustrates a manner in which a hyperbolic shape preferably used for the curved surfaces of the bobweights for 90° V-6 engines can be determined.

The hyperbolic curve feature of the present invention is particularly shown in FIG. 17. In that figure, one-half of the balance shaft 60 (shown in phantom) is shown superimposed on an X-Y grid. The axis of rotation 65 of the balance shaft is aligned with the X axis. As shown, the curve of the surface 64' of balance weight 64 is formed along a hyperbola in accordance with the equation X×Y=C. An infinite number of hyperbolic curves represented by curves $C_1$, $C_2$ and $C_3$, can be used to represent the surface 64' of the bobweight.

Although it is preferred that the shape of the surface 64' be a curve of a hyperbola, it is also possible for the curve to be a reasonable approximation of a hyperbolic curve, as described in U.S. Pat. No. 5,857,388. Also, the end 63 of the bobweight can be truncated or blunted due to, for example, manufacturing and/or design considerations.

The specific curve utilized for the surface of the bobweight (represented by curve $C_2$ in FIG. 17) is selected by adjusting the value of C until the target unbalance couple magnitude is reached with respect to the particular characteristics of the particular engine in which the balance shaft is to be utilized. The particular curve is selected in accordance with the length and diameter afforded by the tubular structure utilized in the correcting couple needed for the particular engine. In this regard, as shown in FIG. 17, a balance weight having a curve surface along curve $C_1$ would provide a lower unbalanced moment than curve $C_2$, while curve $C_3$ would provide a greater unbalanced moment than curve $C_2$. The needed unbalanced couple is thus obtained by means of the appropriate value for constant C, thus avoiding unnecessary weight or mass.

By use of a tubular member for the balance shaft, the present invention eliminates the connecting portion which is typically provided between the bobweights of a conventional balance shaft. In this regard, the connecting portion is normally made of a steel or metal material, and provides unnecessary weight to the balance shaft and thus to the engine. With the present invention, less material is utilized for the balance shaft, thus making it lighter and potentially less expensive. Also, a lighter and stiffer balance shaft will undergo less bending during use. In this regard, a tubular member has a higher section modulus than a solid balance shaft, and thus creates a greater rigidity in the structure and makes it less subject to bending.

Also, with some embodiments of the present invention, portions of the bobweights are positioned beneath the bearing journals. This could allow use of shorter and lighter balance shafts in some applications, again reducing material and manufacturing cost and expense. In these applications, this could reduce the overall weight and cost of the engine which is a desirable feature for automobile manufacturers.

Although the invention is described as using a deep drawn tubular member, it is also possible to provide merely a hollow tubular member which is open at both ends. Such structures are shown, for example, in FIGS. 4 and 20. Plug members can be inserted, welded, or otherwise conventionally fastened to each of the open ends of such a structure. In this regard, a hollow balance shaft member with two end plug members is shown in U.S. Pat. No. 5,483,932, which issued on Jan. 16, 1996 and is entitled "Hollow Balance Shaft". The '932 patent is commonly owned with the present invention and the disclosure thereof is hereby incorporated by reference herein.

The thickness of the material for the tubular member 60 is preferably about 2 millimeters, although other thicknesses can be used if different stiffness and rigidity requirements are present. When the tubular member 60 is formed, annular flat surfaces 66 and 68 are formed on the outer surface. The annular surfaces 66 and 68 are bearing surfaces that are used to position and hold bearing members on them, such as ball bearing members 70. Preferably, two bearing surfaces and two sets of bearing members are provided on a balance shaft in accordance with the present invention, although it is also possible that three or more bearing surfaces and bearings could be provided, depending on the precise structure and configuration of balance shaft needed for a particular engine. In this regard, if a third bearing and bearing surface is provided, it typically is provided approximately at the midpoint of the hollow tubular member 60.

A hollow drive member 30 is also formed on one end of the tubular member 60. The formation of a "neck" in the bottle-type structure adds additional strength to it. A plug member 35 is preferably positioned in the open end of the tubular member 60. The member 35 is securely held in place, such as by friction welding.

The other end 72 of the tubular member 60 can be formed as an enclosed surface, thus creating a "bottle"-type drawn member. This adds increased stiffness and rigidity to the tubular member. Of course, as mentioned above and as shown in FIGS. 4 and 20, it is also possible to provide open ends at both ends of the tubular member and enclose them with plug or cap members.

As indicated above, drive gear 32 is secured to drive member 30 of the balance shaft 12. The gear 32 can be attached in any conventional manner to the balance shaft, such as by a key and slot mechanism 36 or by welding.

Figure 4:
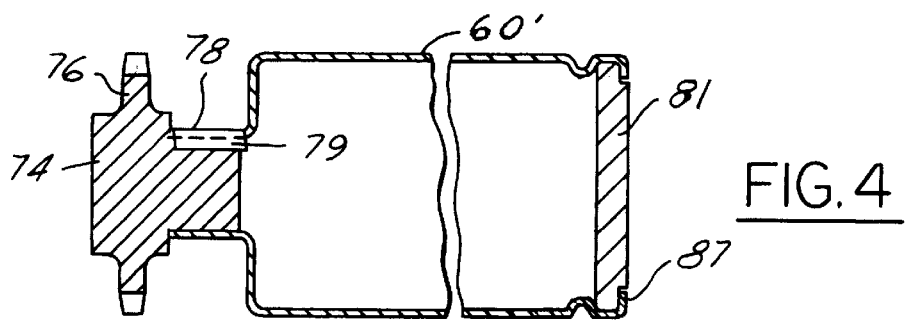
FIG. 4 illustrates an alternative gear drive mechanism and end plug for the invention, as well as an alternate opposite open end with another plug member secured therein.

An alternate embodiment for securing and attaching a gear drive to a "bottle"-type hollow tubular member is shown in FIG. 4. In this embodiment, the tubular member 60' has a metal plug member 74 which includes a drive gear 76. The plug member 74 is secured to the end 78 of the tubular member in any conventional manner, such as welding or a slot and key mechanism 79. The plug members 74 can also be indexed in the tubular member in order to assist in assembling them in their proper orientations and to retain them in place.

In this regard, keying or indexing mechanisms are satisfactory for properly positioning and locating the plugs in the ends of the tubular structure, but additional securing mechanisms or procedures, such as welding, press-fitting, staking, and the like, are usually needed in order to carry the loads imposed upon the plug members during rotation of the balance shafts and thus secure them tightly and permanently in place.

FIG. 4 also depicts an alternate configuration or embodiment of a balance shaft in accordance with the present invention in which both ends of the tubular members are open and plugs are provided to enclose both ends. Metal plug member 81 is provided in end 83 of the tubular member 60'. The outer edges 87 are crimped around the plug member 81 to help hold it in place. The plug member can also be secured to the tubular members by welding or other conventional securing procedures, and is also keyed or indexed in the tubular member in a conventional manner.

Figure 16:
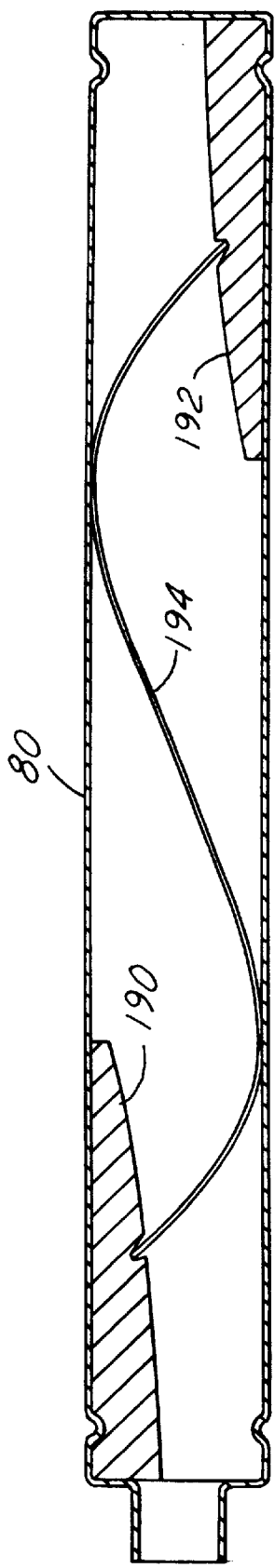

It is also possible in accordance with the present invention, to provide a hollow tubular member that is deep drawn or formed such that both of the ends are substantially enclosed. Such an embodiment is shown in FIG. 16 and indicated by the reference numeral 80.

Figure 3:
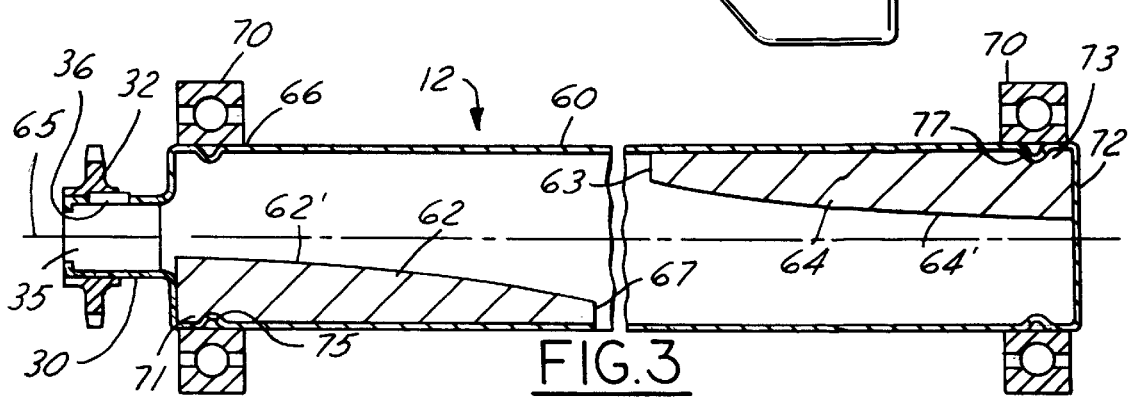
FIG. 3 illustrates one embodiment of the present inventive hollow tubular balance shaft.

The balance weights 62 and 64 of the embodiment depicted in FIG. 3 are positioned in the hollow tubular member 60 before, during or after the formation of the metal material into the hollow tubular shape. Metal forming and drawing techniques are well-known in the art and it would be well within the skill of ordinary artisans in the metal forming fields to produce and provide the structures shown in the drawings herein.

In order to hold the bobweights in position longitudinally in the hollow tubular member, the outer ends 71 and 73 of the bobweights 62 and 64, respectively, can be enlarged and grooves 75 and 77 provided in them. The ends of the tubular member 60 then can be formed around the bobweights and into the grooves 75 and 77 securely holding the bobweights in axial position.

It is also possible to provide additional grooves 166 on the outer surface of the tubular member 60 adjacent its ends under the bearings. The grooves 166 assist in providing lubrication to the bearings. If desired, the grooves utilized to hold the bobweights in place and to provide bearing lubrication can be combined into a single groove. For example, in FIG. 18, a single groove in the tubular member positioned under the bearings is provided for both purposes.

In general, FIGS. 5–26 show alternate ways of positioning and securely holding bobweights in a hollow tubular member in accordance with the present invention. Also, for ease of presentation, only one of the bobweights for each of the tubular member embodiments is illustrated in most instances; it is understood that the other bobweights in each of the tubular members is secured in place in the same or similar manner. In this regard, it is important that the bobweights be held securely in position in the tubular member so that they will not be dislodged or moved during rotation of the hollow balance shaft and thus fail to balance out the shaking and vibration forces in the vehicle caused by the unbalanced engine. It is also important to maintain the precise position of the balance weights in the hollow tubular member relative to each other, typically 180 degrees apart.

Figure 5:
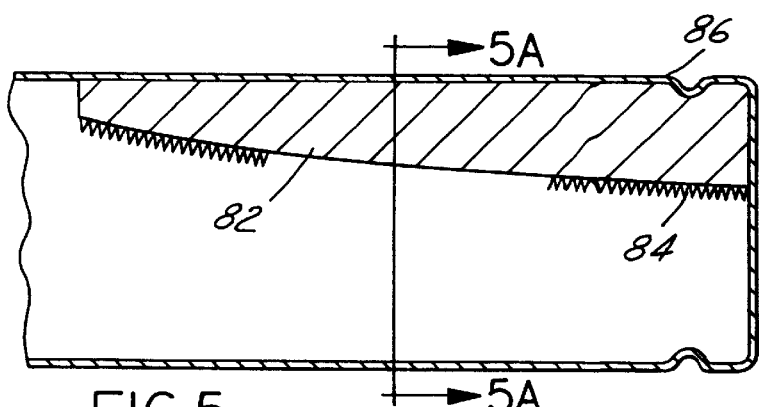
FIG. 5 illustrates a first manner for securing a bobweight in a hollow tubular member.
Figures 5A, 6A:
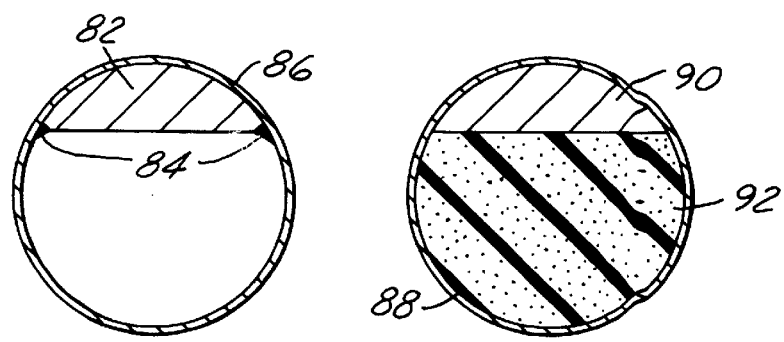
FIG. 5A is a cross-sectional view of the invention depicted in FIG. 5, the cross-section being taken along line 5A—5A and in the direction of the arrows.
FIG. 6A is a cross-sectional view of the embodiment of the invention shown in FIG. 6, the cross-section being taken along line 6A—6A and in the direction of the arrows.

FIG. 5 in combination with FIG. 5A show a bobweight 82 welded by appropriate welds 84 along its edges within the hollow tubular member 86. The position and welding of the bobweight 82 in the hollow tubular member 86 can be performed at an appropriate point in the manufacture of the balance shaft.

The bobweight 82 in FIG. 5 preferably is stitch-welded along the intersection of the edges of the bobweight 82 with the hollow tubular member 86 as required for strength. Alternately, the bobweight 82 can be securely held in position by other conventional and equivalent means, such as furnace brazing, adhesive bonding and the like. In this regard, furnace brazing would require brazing up to 100 percent of the contact area between the bobweight and the metal tubular member as required for strength. If an adhesive material is used, such as a cement or another type of glue, then 10–100 percent of the contact area between the bobweight and the tubular member could be utilized as required for strength. Adhesive bonding would be preferable for a balance shaft member in which the bobweights and the hollow tubular member are made from dissimilar materials. For brazing, the bobweight and tubular member should be made of the same or compatible materials. Also, the bobweights should be held in place in the tubular member by a jig or fixture during the securing operations.

Figure 6:
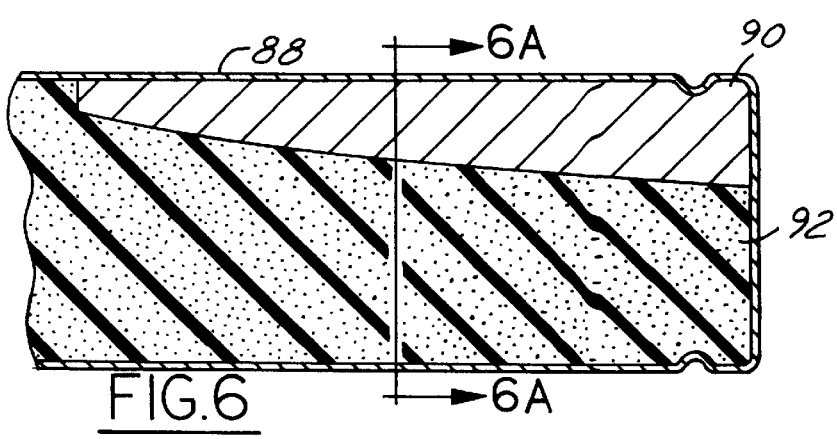
FIG. 6 illustrates a second manner for securing a bobweight in a hollow tubular member in accordance with the present invention.

In FIGS. 6 and 6A, the hollow tubular balance shaft member 88 has a bobweight 90 which is secured in place by filling the tube with a foam material 92. It is also possible to fill the tubular member 88 with other conventional filler-type materials, such as rubber, lightweight metal, plastic, or any other lightweight material which can be inserted and flowed into place under pressure forcing the bobweight 90 into position and securely holding it in place.

Figure 7:
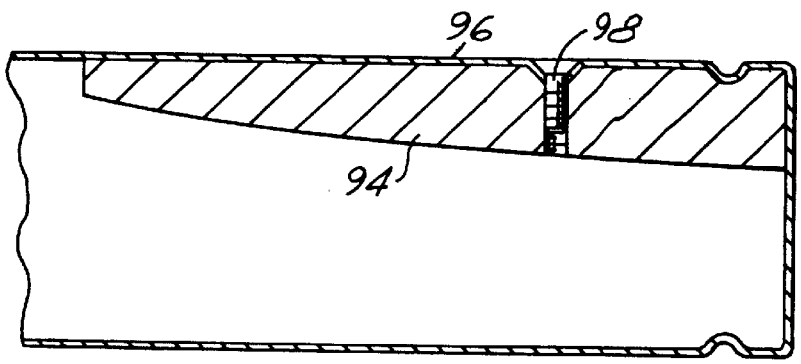
FIGS. 7, 8 and 9 illustrate alternative ways in which the bobweight can be secured in place in a hollow tubular member in accordance with the present invention.
Figure 8:
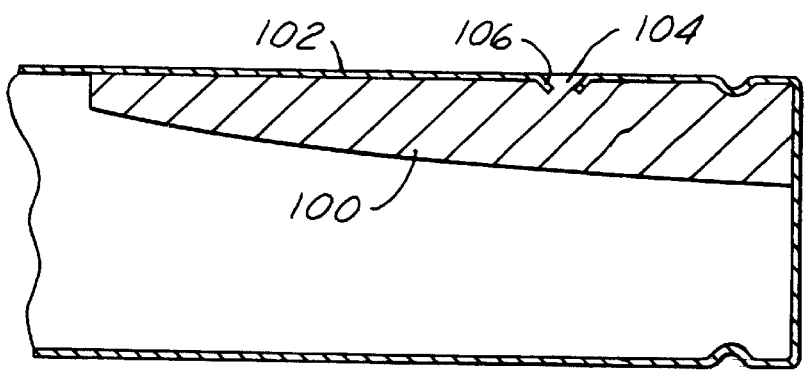

FIGS. 7 and 8 show representative mechanical fastening mechanisms for securing bobweights to hollow tubular members in the balance shaft. In FIG. 7, the bobweight 94 is secured to the hollow tubular member 96 by one or more fasteners, such as screws 98. Other conventional fastening members could also be utilized. In FIG. 8, the bobweight 100 is secured to the hollow tubular member 102 by forming a rivet means 104 in the bobweight and integrating the rivet with a portion 106 of the hollow tubular member. The bobweights 94 and 100 could be held in place in the hollow tubular members 96 and 102, respectively, with a plurality of fasteners or rivet mechanisms, as desired.

Figure 9:
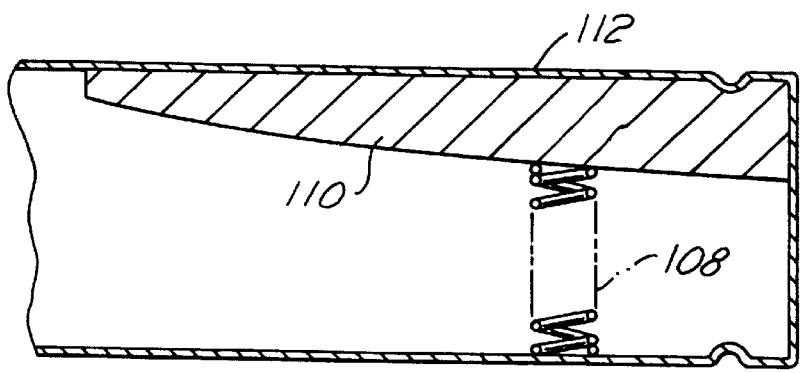

In FIG. 9, one or more coil springs 108 are used to hold the bobweight 110 in position in the hollow tubular member 112. The coil spring 108 can be secured in any conventional manner to the bobweight and/or hollow tubular member.

Figure 10:
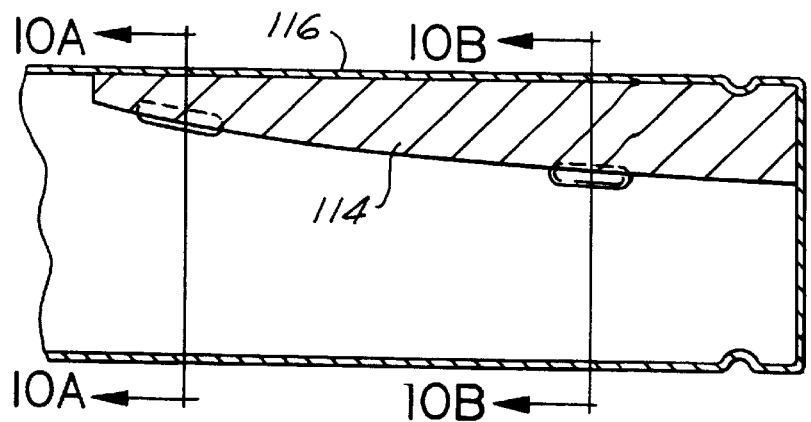
FIG. 10 illustrates still another embodiment of the invention in which the bobweights are secured in the hollow tubular member in an alternative manner.

In FIG. 10, the bobweight 114 is secured to the hollow tubular member 116 by staking. Once the bobweight 114 is positioned appropriately in the hollow tubular member 116, the hollow tubular member is staked at two or more positions 118 and 120 along the length of the bobweight as shown in FIGS. 10A and 10B. The bobweight could be staked to the hollow tubular member in as many positions as required for secure fixation.

Figure 11:
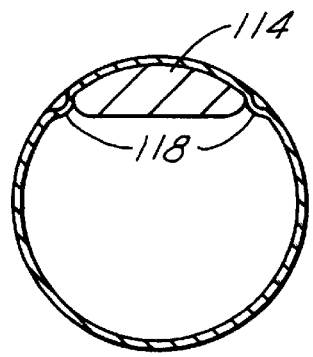
FIGS. 11 and 12 illustrate still further alternative embodiments of the present invention, with FIG. 11A being a cross-sectional view of the subject matter of FIG. 11, the cross-section being taken along line 11A—11A and in the direction of the arrows.
Figure 11:
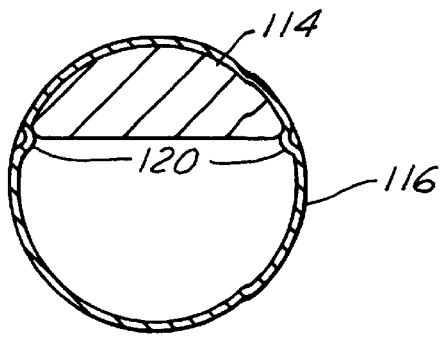
Figure 11:
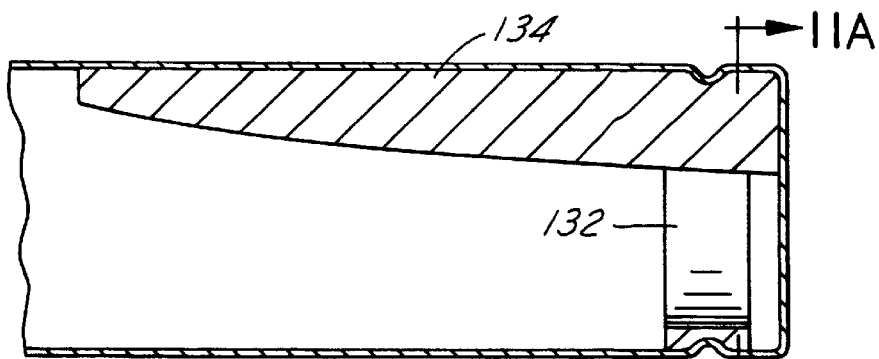
Figure 11A:
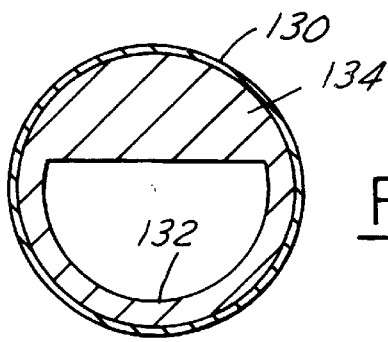

As shown in FIGS. 11 and 11A, another hollow tubular balance shaft member 130 is provided. An annular ring member 132 is used to hold the bobweight 134 in place in the tubular member 130. The ring member 132 could be made as an integral part of the bobweight member 134, or alternatively, could be provided as a separate member. The bobweight 134 and ring member 132 are pressed into place in the tubular member 130. The ring member could also be held in position within the tubular member in any known manner. The ring member 132 also provides added strength in the balance shaft member if a bearing is positioned on the outer surface 136.

Figure 15:
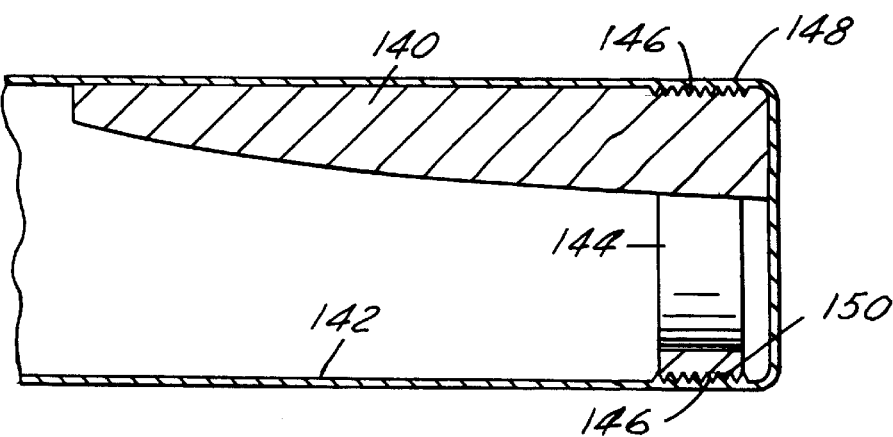

An alternative to the embodiment shown in FIG. 11 is shown in FIG. 15 wherein the bobweight and ring member are threaded into the end of the tubular member. The bobweight 140 is shown threaded into the tubular member 142, along with ring member 144. Both the inside surface 146 of the end of the tubular member 142 and the outer surface 148 of the bobweight and surface 150 of the ring member 144 have mating threaded surfaces.

Figure 12:
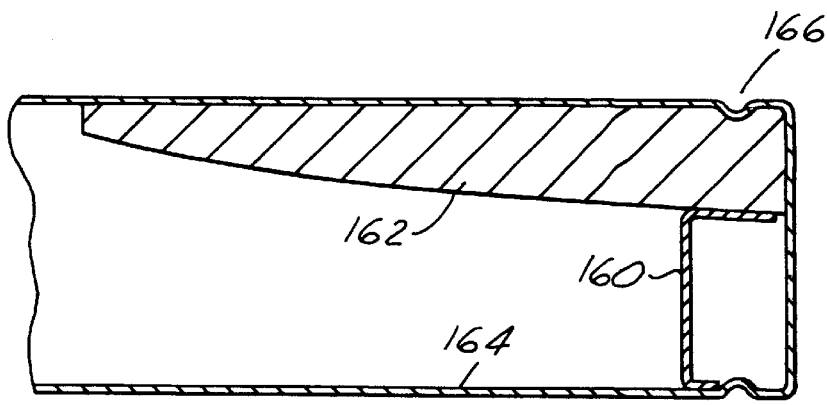

Another embodiment for securely holding a bobweight in place is shown in FIG. 12. In this embodiment, a separate structural member 160 is pressed or otherwise secured in position between the bobweight 162 and hollow tubular member 164. The structural member could be any type of support. member, such as a deep drawn metal cup. The structural member 160 also adds additional strength to the balance shaft, particularly adjacent the bearing surface 166.

Figure 13:
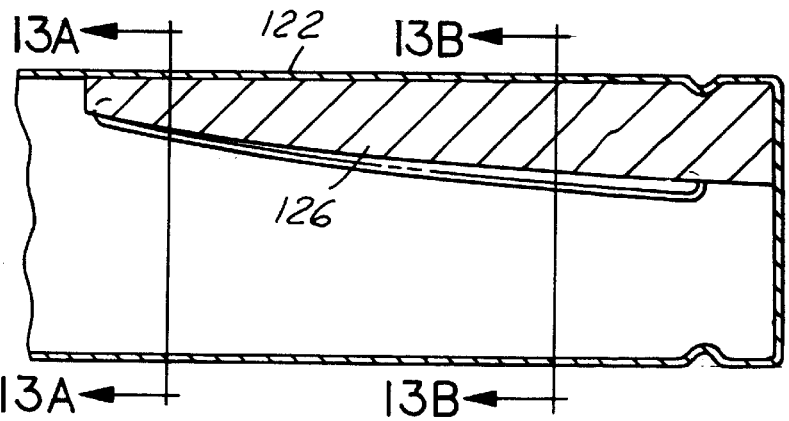
FIG. 13 illustrates another alternative embodiment of the invention, with FIGS. 13A and 13B being cross-sectional views of the subject matter of FIG. 13, the cross-sections being taken along line 13A—13A and 13B—13B, respectively, and in the direction of the arrows.
Figure 13A:
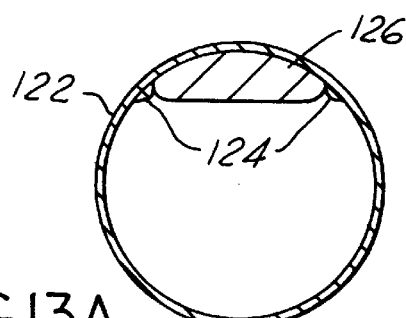
Figure 13B:
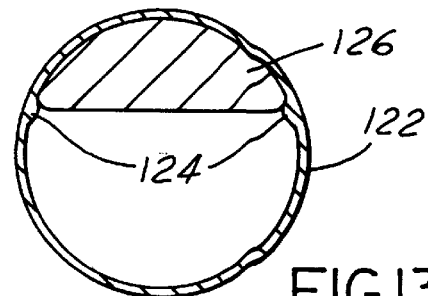

In FIG. 13, and as shown in FIGS. 13A and 13B, the hollow tubular member 122 is formed with molded ridges 124 which are positioned in order to securely hold the bobweight 126 in place. The ridges 124 can be continuous along a fixed path on the sides of the hollow tubular member 122, or can consist of several short ridges in a row. In order to secure the bobweight 126 in the tubular member 122, the bobweight is "snapped" or "popped" into place past the molded ridges 124.

Figure 14:
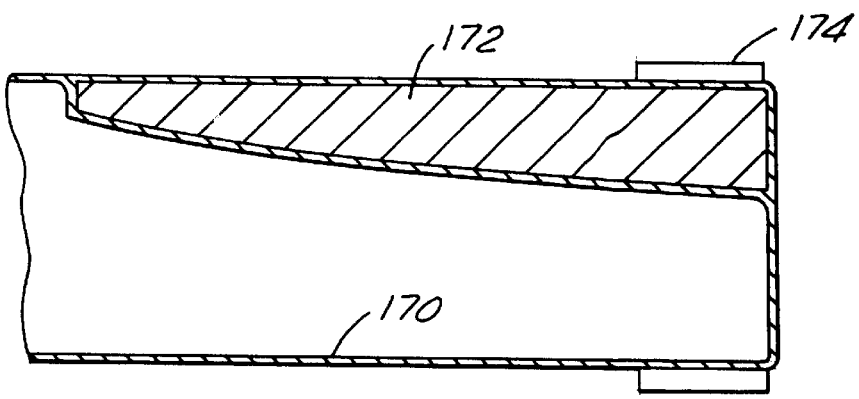
FIGS. 14, 15, and 16 illustrate still additional alternate embodiments of the present invention.

A hollow balance shaft member made from a plastic material is shown in FIG. 14. The plastic tubular member 170 is molded in the shape and configuration shown with bobweight 172 partially or entirely molded within it. The plastic tubular member 170 is made in any conventional manner, such as being cast or injected molded. Preferably, a metal sleeve member 174 is provided on the outer surface of the plastic hollow tubular member where the bearing members (not shown) are to be positioned. The sleeve 174 can be slid over the end of the tubular member 170 and provide the necessary bearing surface for the bearing.

A still further alternate embodiment of the present invention is shown in FIG. 16. In this embodiment, the bobweights 190 and 192 are held in place by a curved or S-shaped leaf spring member 194. The ends 195 of the spring member 194 are positioned in pockets or grooves 196 in the bobweights. The bobweights and leaf spring member are positioned in the hollow tubular member 80 during the formation thereof. Preferably, the bobweights are indexed or keyed to the tubular member in some manner, as discussed herein, in order to position them properly in place. If necessary, the spring member 194 and bobweights 190 and 192 can also be secured to the inside surfaces of the hollow tubular member in any of the methods disclosed above. A plug member 198 is positioned in the "open" end of the tubular member and the ends 199 of the tubular member are crimped, helping to hold the plug member in place.

Figure 18:
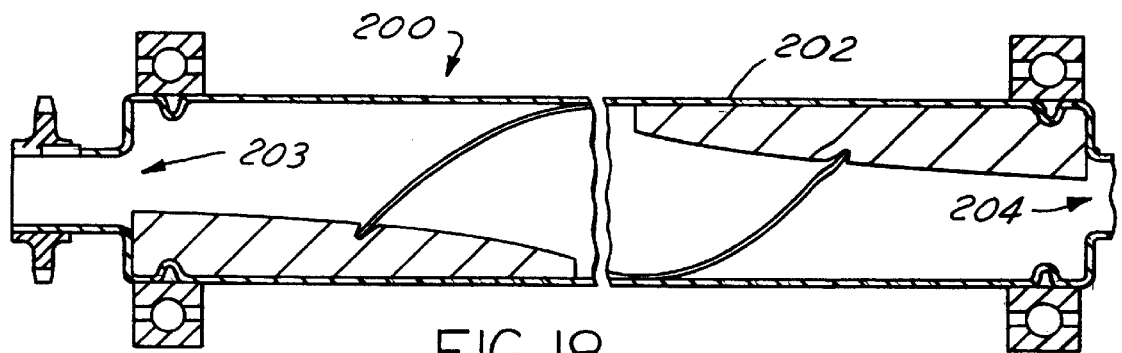
FIGS. 18 and 19 depict two alternate embodiments of the inventive structure shown in FIG. 16.
Figure 19:
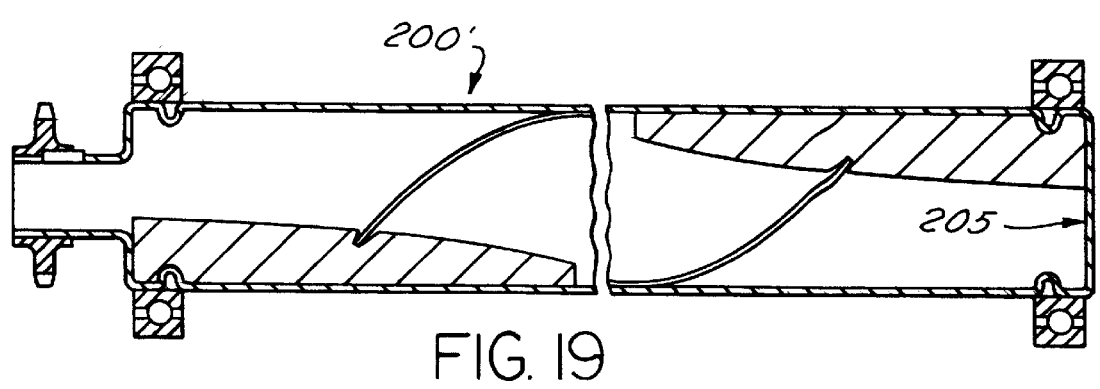
Figure 20:
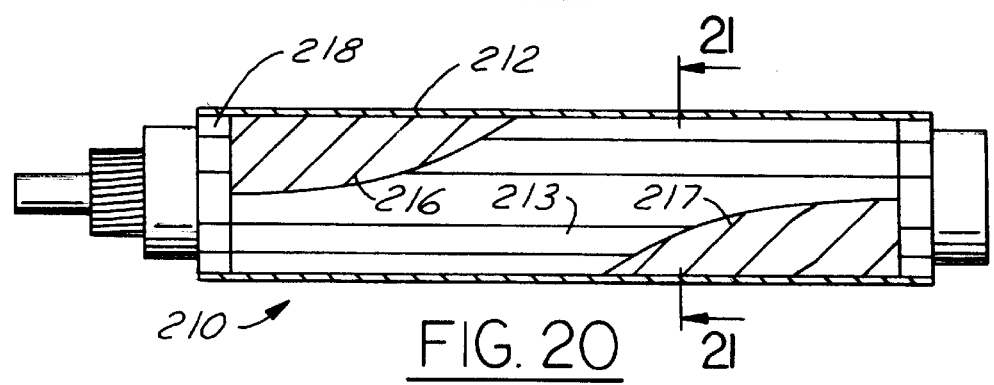
FIG. 20 illustrates an alternate embodiment of the invention particularly utilized for indexing and positioning of the bobweights inside the tubular member.
Figure 21:
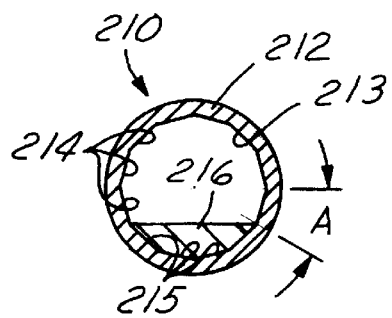
FIG. 21 is a cross-section of the embodiment shown in FIG. 20 taken along line 21—21 in FIG. 20 and in the direction of the arrows.

FIGS. 18 and 19 illustrate two alternate embodiments of tubular members and balance shaft structures which can be utilized in accordance with the present invention. In FIG. 18, the tubular member 202 for balance shaft 200 is made with two "open" ends 203 and 204. The ends can be provided with plug members and be crimped or otherwise secured to the plug members. In FIG. 19, the balance shaft 200' has one "open" end 203 and one "closed" end 205. The selection of either embodiment can be made based on such features as cost, ease of manufacture, and/or length of available engine space for the balance shaft, among others.

FIGS. 20–26 illustrate additional embodiments and features particularly useful for indexing and accurately positioning the bobweights in place in the tubular members. In the balance shaft 210 shown in FIGS. 20 and 21, the inside surface 213 of the tubular member 212 includes a plurality of "flats" 214 around its circumference. The flat portions extend from one end of the tubular member to the other end and mate with corresponding flat portions 215 on the balance weights 216 and 217. Each of the flat portions 214 extend an angle "A" around the circumference. Any reasonable number of flat portions can be provided in the tubular members. Preferably, a symmetric equal-sided polygon shape is provided inside the tubular member with an even number of flat portions. The mating flat portions 214 and 215 allow the bobweights 216 and 217 to be positioned accurately inside the tubular member, particularly 180° apart with respect to each other.

The balance shaft 210 also depicts a tubular member which has two plug members 218 and 219 positioned at its ends. The plug members can be provided integrally as part of the bobweights 216 and 217, or as separate components welded or otherwise secured to the tubular member 212.

Figure 22:
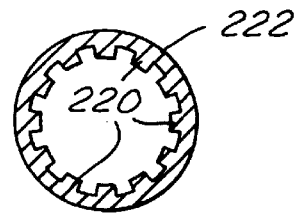
FIGS. 22 and 23 illustrate alternate mechanisms for indexing and positioning of the bobweights.
Figure 23:
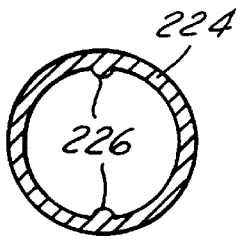

Other mechanisms for indexing and properly positioning the bobweights in the tubular members are shown in FIGS. 22 and 23. In FIG. 22, a plurality of splines or ridges 220 are provided extending along the inside surface of the tubular member 222. The bobweights (not shown) have mating splines and/or grooves in order to securely fit in the balance shaft member. In FIG. 23, the tubular member 224 has simply a pair of opposed ridges 226 spaced 180° apart. The bobweights utilized for the embodiment shown in FIG. 23 have mating grooves along their lengths in order to be seated on the ridges.

Figure 24:
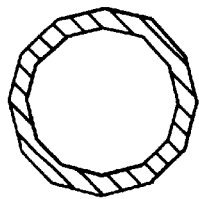
FIGS. 24 and 25 depicts still another embodiment of the invention, with FIG. 26 being a cross-sectional view of FIG. 25 taken along line 26—26 and in the direction of the arrows.

In order to save material and weight, the shape of the outside surface or circumference of the tubular member could also be made to correspond to the inside surface. In FIG. 24, the outer surface 228 of tubular member 212' is provided with a plurality of elongated axial-extending flat portions 230 which match the flat portion 214' on the inner surface 213'.

Figure 26:
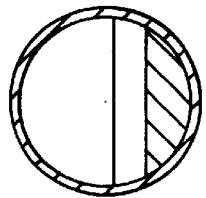
Figure 25:
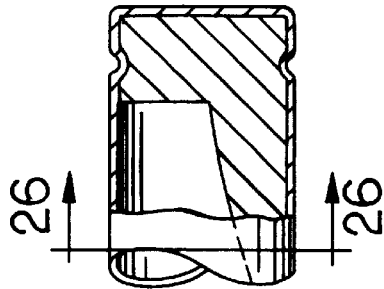

An additional embodiment is shown in FIGS. 25 and 26. The balance shaft 240 has a tubular member 242 and a pair of bobweights 244 (only one of which is shown). The bobweight 244 has an annular supporting ring 246 which is snugly fit inside the end of the tubular member. In this regard, the "magna-form" process known today could be utilized to shrink the outer tube around the bobweight and ring 246 integrally and permanently affixing the weight in place in the tubular member. The width "W" of the ring 246 should preferably be kept to a minimum.

Figure 34:
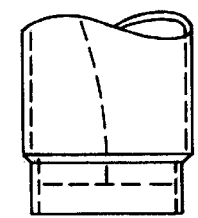
Figure 33:
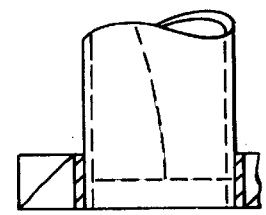
Figure 32:
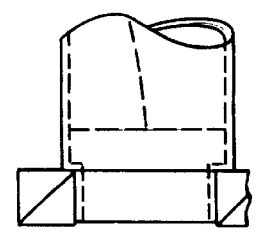

Other possible designs and structures for positioning and placement of the bearings on the tubular balance shaft members are shown in FIGS. 32–35. In FIG. 32, a portion 250 of a cast bobweight 251 is positioned to extend or protrude outside the end of the tubular member 252. The bearing 253 can be positioned on the protruding portion 250. In FIG. 33, the bearing 256 is pressed on a wear sleeve 257 which is positioned on the external surface of the tubular member 258. In FIG. 34, the bearing support member 260 is machined directly on the end of the tubular member 262, while in FIG. 35, the end of the tubular member 264 has a bearing support member 265 roll formed thereon. The bearing structures thus can be formed as part of the cast bobweights, be formed as part of the tubular members, or be part of an attachment (plug member) secured on the ends of the tubular members. In this regard, the attachments can be made of any applicable materials, such as aluminum or steel. Also, the ends of the tubular members could be wear hardened for added strength and durability. And, chemical hard coating could be sprayed on the ends of the tubular members.

Figure 28:
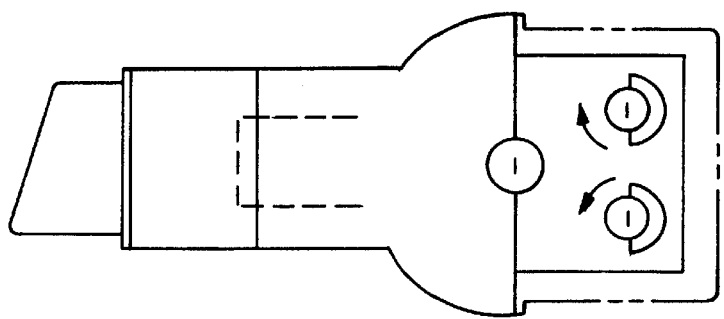
FIGS. 27 and 28 are side and front views, respectively, of an inline four-cylinder engine incorporating two single unbalance-type shafts.
Figure 27:
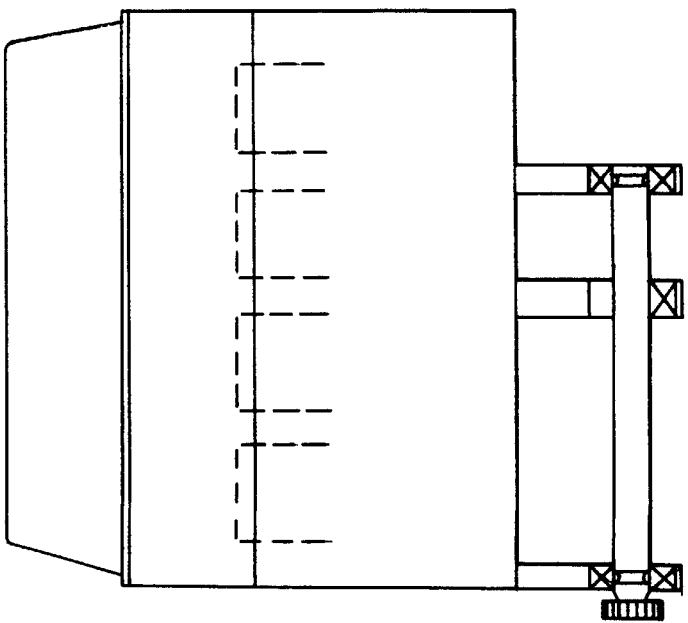

FIGS. 27 and 28 show the side and front views, respectively, of an inline four-cylinder automobile engine 300. The engine has an engine block 302 and a crankshaft 304 which is rotated by the rods connected to the pistons 306 in the engine. A pair of balance shafts 310 is used to reduce or cancel shaking forces and/or vibration caused by the movement of the reciprocating components in the engine 300. The balance shafts 310 are "single unbalance"-type shafts and each produce a single unbalanced force. The two balance shafts 310 cancel each others' lateral shaking forces, while opposing the vertical secondary shaking forces that are caused by the engine 300.

Each of the balance shafts 310 is typically held in position by bearings 312, 314 and 316. These bearings are held in bearing seats 312A, 314A and 316A, respectively, in FIG. 27. Although the location and support for only one of the two balance shafts 310 are shown in FIG. 27, the second balance shaft of the pair of balance shafts for the engine 300 is positioned and held in place in substantially the same manner. Also, although three bearings are described as supporting each of the balance shafts, is also possible to utilize only two bearings and two bearing seats for each balance shaft 310. Where only two bearings are utilized, they typically are positioned adjacent the ends of the balance shafts.

Figure 29:
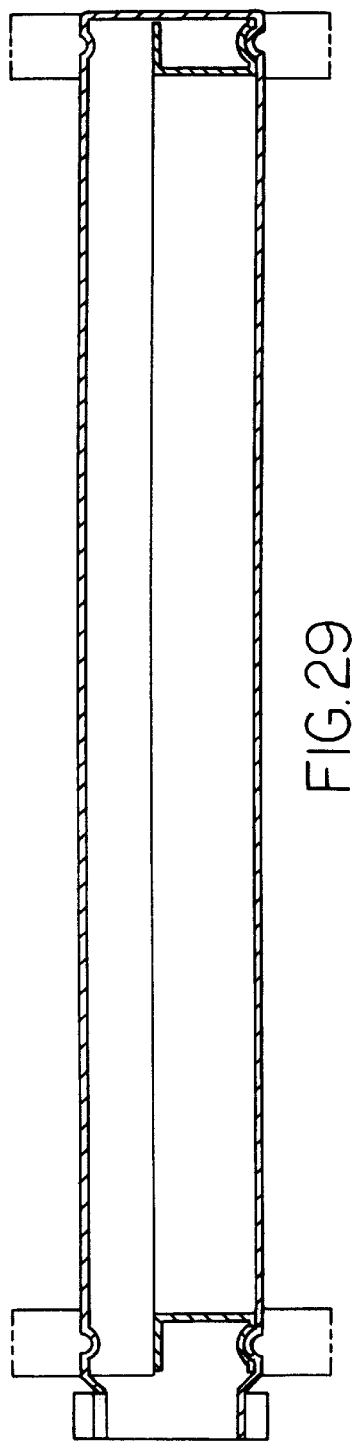
FIG. 29 is a side cross-sectional view of a single unbalance-type shaft for an inline four-cylinder engine incorporating the present invention.

FIG. 29 depicts one of the two single unbalance-type balance shafts 310 made in accordance with the present invention and provided in the engine 300. Each of the balance shafts 310 has a drive member 320 at one end, a hollow tubular body member 322 and a balance weight 324. The balance shafts 310 rotate around a central axis 326. The balance weights 324 of the two balance shafts each have the same size and weight and have a length and mass sufficient to balance the shaking forces and/or vibration forces in the engine. In the embodiment shown in FIG. 29, the balance weight 324 has a constant cross-section, extends the length of the tubular member 322, and fills a portion of its internal volume. The weight 324 is held and supported in place by a pair of support members 330 and 332. The support members are preferably positioned in radial alignment with the bearings 340 which hold and support the balance shafts in the engine for rotation. Sleeve members (not shown) can also be utilized for the bearing surfaces (as described above with respect to FIG. 14).

The balance weights 324 also can be secured and held in position in the tubular member 322 in any of the methods set forth above with reference to FIGS. 1–26. These methods include, for example, welding, staking, foam filling the central volume, fastening, and the like. The balance weights can also be indexed to the inner surface of the tubular member in any of the methods set forth above in order to retain the weights more easily in their proper positions, as well as to more easily assemble them in the tubular members.

The drive member 320 on the balance shaft 322 protrudes outside the front of the engine 300 and has a drive gear 342 attached to it. The gear 342 can be press-fitted and/or attached to the drive member in any conventional manner.

Figure 30:
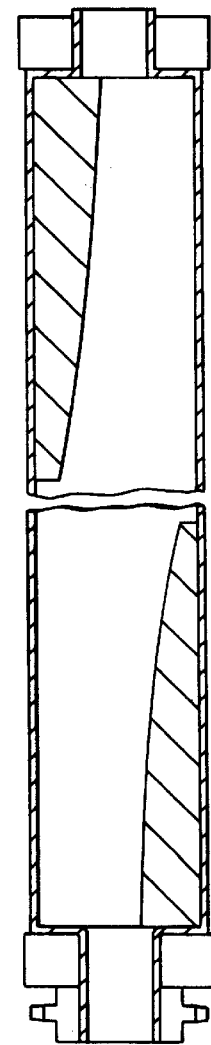
FIG. 30 illustrates still another embodiment of the invention.

The bearings on the tubular balance shafts in accordance with the present invention are preferably positioned on the larger diameters of the tubular members, adjacent the ends of the tubular members, and in radial alignment with a portion of the bobweights. Embodiments of these types are shown and described above. It is also possible to provide a tubular balance shaft structure in accordance with the invention in which the bearings are positioned axially outside the bobweights, as shown in FIG. 30. The balance shaft 280 has a tubular member 281 with a pair of bobweights 282 and 283 positioned and secured therein, and a pair of reduced diameter protruding members 284 and 285 positioned at its ends. Bearings 286 and 287 are positioned on the protruding members and plug members 288 and 289 are positioned in the protruding members and under the bearings. A drive gear 290 is positioned on protruding member 284 which also is the driving member for rotation of the balance shaft.

Figure 31:
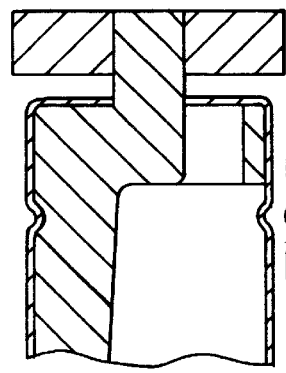
FIG. 31 illustrates a still further embodiment of the invention.
Figure 35:
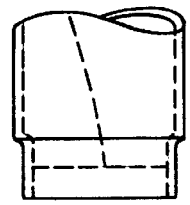
FIGS. 32–35 depict alternate structures for providing and positioning the bearings on the tubular balance shafts in accordance with the present invention.

Instead of having separate reduced diameter protruding members on the ends of the tubular member and separate plug members, the outer end of one or both of the bobweights could be provided with an extending shaft, as shown in FIG. 31. The balance shaft 292 has a bobweight 293 positioned inside the tubular member 294. The bobweight has an extending shaft member 295 which extends or protrudes out the end of the tubular member. A drive gear 296 can be press-fitted or otherwise conventionally secured to the shaft member. In addition, the shaft could have sufficient length to also position a bearing thereon.

Having now fully described the invention, it will be apparent to one of ordinary skill in the art that many changes and modifications can be made thereto without departing from the spirit or scope of the invention as set forth herein.

What is claimed is:

1. A balance shaft for a vehicle engine, said balance shaft comprising:
   a hollow tubular member having an axis of rotation, a first end, a second end disposed opposite said first end, and an inner peripheral surface;
   a pair of bobweight members positioned in said tubular member with one of said pair of bobweight members positioned adjacent said first end and the other of said pair of bobweight members positioned adjacent said second end; and
   each of said pair of bobweight members being positioned entirely on opposing sides of said axis of rotation and each of said pair of bobweight members having an outer surface entirely in contact with said inner peripheral surface.

2. The balance shaft for a vehicle engine of claim 1 wherein at least one end of said hollow tubular member is enclosed.

3. The balance shaft for a vehicle engine of claim 2 wherein said tubular member is a bottle-type tubular member with one end being enclosed during the formation thereof.

4. The balance shaft for a vehicle engine of claim 1 wherein said bobweight members have curved inner surfaces thereon.

5. The balance shaft for a vehicle engine of claim 4 wherein said curved surfaces have hyperbolic shapes.

6. The balance shaft for a vehicle engine of claim 1 further comprising at least two annular bearing surfaces on said tubular member.

7. The balance shaft for a vehicle engine of claim 1 further comprising means to secure said bobweight members in position in said tubular member.

8. The balance shaft for a vehicle engine of claim 7 further comprising a ring member.

9. The balance shaft for a vehicle engine of claim 8 wherein said ring member and bobweight members are threadably secured in place.

10. The balance shaft for a vehicle engine of claim 1 wherein the bobweight members are positioned at opposite ends of said tubular member and 180 degrees apart.

11. The balance shaft for a vehicle engine of claim 1 further comprising a drive member at one end of said tubular member.

12. The balance shaft for a vehicle engine of claim 1 further comprising means to seal the ends of the tubular member.

13. The balance shaft for a vehicle engine of claim 12 wherein said sealing means comprises a plug member independent of said bobweight members.

14. A balance shaft for a vehicle engine, comprising:
   a hollow tubular member having an inner peripheral surface, an outer peripheral surface, a first end and a second end disposed opposite said first end, said hollow tubular member having a centerline;
   a first bobweight member having a first surface entirely in communication with said inner peripheral surface adjacent said first end and a second surface opposing said first surface;
   a second bobweight member having a first surface entirely in communication with said inner peripheral surface adjacent said second end and a second surface opposing said first surface;
   both said first and second bobweight members being positioned individually and completely in said tubular member and being disposed on opposing sides of said centerline.

15. The balance shaft for a vehicle engine of claim 14, wherein at least one end of said hollow tubular member is enclosed.

16. The balance shaft for a vehicle engine of claim 15, wherein said tubular member is a bottle-type tubular member with one end being enclosed during the formation thereof.

17. The balance shaft for a vehicle engine of claim 14, wherein said second surface of said first bobweight member and said second surface of said second bobweight member are curved.

18. The balance shaft for a vehicle engine of claim 17, wherein said first bobweight member second surface and said second bobweight member second surface have hyperbolic shapes.

19. The balance shaft for a vehicle engine of claim 18, wherein each of said first and second bobweight members has an inner end, with each of said inner ends being truncated.

20. The balance shaft for a vehicle engine of claim 14, further comprising at least two annular bearing surfaces on said tubular member.

21. The balance shaft for a vehicle engine of claim 20, wherein a bearing is located around each of said two annular bearing surfaces.

22. The balance shaft for a vehicle engine of claim 14, further comprising a securing means for positioning said bobweight members in position in said tubular member.

23. The balance shaft for a vehicle engine of claim 22, wherein said securing means includes a ring member associated with each of said first and second bobweight members for supporting and positioning said bobweight members in said hollow tube.

24. The balance shaft for a vehicle engine of claim 23, wherein said ring member and said bobweight members are threadably secured in place.

25. The balance shaft for a vehicle engine of claim 14, wherein said first and second bobweight members are positioned at opposite ends of said tubular member and are positioned 180 degrees apart.

26. The balance shaft for a vehicle engine of claim 14, further comprising a drive member at one end of said tubular member.

27. The balance shaft for a vehicle engine of claim 14, further comprising sealing means for closing the ends of the tubular member.

28. The balance shaft for a vehicle engine of claim 27, wherein said sealing means comprises a plug member independent of said bobweight members.

* * * * *